US006986068B2

(12) United States Patent
Togawa

(10) Patent No.: US 6,986,068 B2
(45) Date of Patent: Jan. 10, 2006

(54) ARITHMETIC PROCESSING SYSTEM AND ARITHMETIC PROCESSING CONTROL METHOD, TASK MANAGEMENT SYSTEM AND TASK MANAGEMENT METHOD

(75) Inventor: Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 10/130,566

(22) PCT Filed: Sep. 21, 2001

(86) PCT No.: PCT/JP01/08254

§ 371 (c)(1),
(2), (4) Date: Jul. 30, 2002

(87) PCT Pub. No.: WO02/25439

PCT Pub. Date: Mar. 28, 2002

(65) Prior Publication Data

US 2003/0115239 A1 Jun. 19, 2003

(30) Foreign Application Priority Data

Sep. 22, 2000 (JP) ............................ 2000-287882

(51) Int. Cl.
*G06F 1/32* (2006.01)
*G06F 1/28* (2006.01)
(52) U.S. Cl. .................... 713/320; 713/300; 713/322
(58) Field of Classification Search ................ 713/300, 713/320, 322, 323, 600
See application file for complete search history.

(56) References Cited

U.S. PATENT DOCUMENTS 5,812,860 A * 9/1998 Horden et al. ............... 713/322
6,425,086 B1 * 7/2002 Clark et al. .................. 713/322

FOREIGN PATENT DOCUMENTS

JP 11194849 A * 7/1999
JP 2000122747 A * 4/2000

OTHER PUBLICATIONS

Yann-Hang Lee et al.; Voltage-Clock Scaling for Low Energy Consumption in Real-time Embedded Systems; Real-Time Computing Systems and Applications, 1999. RTCSA '99. Sixth International Conference on, Dec. 13-15, 1999; pp. 272-279.*
Takanori Okuma et al.; Real-Time Task Scheduling for a Variable Voltage Processor; System Synthesis, 1999. Proceedings. 12th International Symposium on , 10-12, 1999 □□pp.: 24-29□□.*

* cited by examiner

*Primary Examiner*—Thomas Lee
*Assistant Examiner*—Ji H. Bae
(74) *Attorney, Agent, or Firm*—Jay H. Maioli

(57) ABSTRACT

A system capable of changing an operating frequency and a power source voltage of a processor, the operating frequency of the processor necessary for processing a periodic real-time task and a non-real-time task at the same time as an optimum value of the power source voltage for the processor is determined to be responding to the operating frequency changing with time, so as to diminish the power consumption of the processor, as the application's real-time request is met.

16 Claims, 10 Drawing Sheets

ARITHMETIC PROCESSING SYSTEM AND ARITHMETIC PROCESSING CONTROL METHOD, TASK MANAGEMENT SYSTEM AND TASK MANAGEMENT METHOD

TECHNICAL FIELD

This invention relates to a power diminishing technique relevant to a processor of the type executing one or more tasks simultaneously. More particularly, it relates to a power diminishing technique relevant to a processor executing one or more tasks operating at different periods.

Still more particularly, it relates to a power diminishing technique relevant to a processor of the type executing a periodic real-time task that needs to be completed before the start of the next period, as a parallel operation to a non-real-time task exempt from such constraint, and to a power diminishing technique of reducing the power consumption by a processor while responding to the requirement for real-time execution of an application.

BACKGROUND ART

With the recent revolutionary progress in the LSI (Large Scale Integration) technology, a variety of information processing equipment and information communication equipment have been developed and marketed. With these equipment, a CPU (Central Processing Unit) or other processors execute a preset program code to render variegated processing services.

On the other hand, reduction in power consumption in information equipment is becoming incumbent because this is relevant to the elongation of the useful life of a battery in battery driven type information equipment. Even in information equipment that can be driven apparently limitlessly with the commercial power source, power saving is recommended from the socio-ecological aspect that supply of natural resources cannot be limitless.

Within the information equipment, the proportion of power consumption of a processor as its main controller in the power consumption of the entire equipment is rather high. Stated differently, power saving of the processor leads to realization of power saving of the entire information equipment. By and large, the operating speed of the processor becomes higher the higher becomes the operating frequency, with the power consumption then tending to be increased.

For example, the Japanese Laying-Open Patent Publication H-11-194849 discloses a data processing method and apparatus in which a preset processing operation can be finished within a preset processing time without uselessly increasing the power consumption and in which the setting operation may be facilitated even if the task processing capacity is changed.

In the data processing apparatus disclosed in the above cited publication, the processing capacity and the processing time in case a micro-computer executes variegated processing operations are registered in capacity registration means and in the time storage means, respectively, the processing capacity and time are computed for variegated processing operations carried out by the micro-computer, and the processing capacity is divided by the processing time to calculate the processing speed of the micro-computer to change the frequency of reference clocks. Since the processing speed of the micro-computer is varied with the processing capacity and the processing time, a preset processing operation can be positively finished within a preset processing time, while the frequency of the reference clocks can be set at an optimum value, thus preventing the power consumption in the data processing apparatus from increasing wastefully.

However, with the data processing method and apparatus disclosed in the above cited publication, it is envisaged to reduce the power consumption by solely changing the operating clock frequency of the processor. Stated differently, while the power consumption per unit time is decreased by diminishing the operating clock frequency, the required time for completing each processing is elongated, so that no sufficient effect in reducing total power consumption may be achieved. Specifically, the extent of saving in power consumption achieved is not higher than the amount of power consumption when the processor is in the idling state, with the result that power consumption cannot be saved effectively.

Moreover, with the data processing method and apparatus, disclosed in the above cited publication, it is presupposed that the processing timing of each processing is pre-set, and that, by sequentially performing respective processing operations without interruptions, the totality of the processing operations can be finished in time. Thus, the data processing method or apparatus cannot be applied to a system in which it may become necessary to interrupt a given processing operation to proceed to a more urgent processing, such as real-time processing.

The Japanese Laying-Open Patent Publication 2000-122747 discloses a controlling method and apparatus in which a clock generator supplying clocks to a digital signal operating processor is provided and in which the frequency of the clocks supplied from the clock generator to a digital signal operating processor is controlled on the basis of the operating processing quantity in the digital signal operating processor to diminish the power consumption.

Moreover, with the data processing method and apparatus disclosed in the above cited publication, it is contemplated to reduce the power consumption by solely changing the operating clock frequency of the processor. In other words, while the power consumption per unit time may be decreased by diminishing the operating clock frequency, the required time for completing each processing is elongated, with the result that the effect in reducing total power consumption is not that high. Specifically, the extent of saving in power consumption achieved is not higher than the amount of power consumption when the processor is in the idling state, so that no sufficient effect in the saving in power consumption may be achieved.

Additionally, with the controlling method and apparatus, disclosed in the above cited publication, the operating frequency is computed from the proportion of the idling time. However, under a multi-tasking environment designed for carrying out a large number of tasks operating with different periods, it is not possible to compute the proportion of the idling time.

On the other hand, in the SS and SD scheduling techniques, as proposed in a treatise by Takanori Okuma, Tohru Ishihara and Hiroto Yasuura, entitled 'Real-Time Task Scheduling for a Variable Voltage Processor' (IEEE 12th International Symposium on System Synthesis, November 1999), it is presupposed that the start time of task execution is known prior to system running. This indicates that rescheduling is necessary to perform every time a task is supplemented or deleted. Moreover, this scheduling must be performed by computing the scheduling with the least common multiple of the periods of the respective periodic tasks as a period. With the least common multiple of these periods being not sufficiently small, the task supplementing or deleting efficiency is worsened.

Additionally, with the DD scheduling technique, proposed in this treatise, the scheduling which takes into account the fact that a task is started with a specified pattern is not used, as in periodic sled, so that no sufficient effect in reducing power consumption may be achieved.

The technique termed "Task Based Static Scheduling" as proposed in a treatise by Yann-Hang Lee and C. M. Krishna, entitled "Voltage-Clock Scaling for Low Energy Consumption in Real-time Embedded Systems" (IEEE Sixth International Conference on Real-Time Computing Systems and Applications, December 1999), is premised on scheduling a task by a static priority method. However, the static priority method is known to be inferior to the fastest deadline priority scheduling, in its scheduling capability, such that this technique also is not satisfactory in its effect in diminishing the power consumption.

By and large, if the operating frequency is increased, a processor tends to become faster in its operating speed, but is increased in power consumption, as discussed above. On the other hand, the power source voltage, in other words, the power consumption, must be increased with the processor's operating frequency. However, as the design rule in the LSI manufacturing process becomes finer, an upper limit is set on the power source voltage, so that, in reality, it has not been practiced to raise the frequency by raising the voltage.

In a system in which the processor's operating frequency as well as the power source voltage can be changed through dynamic control, it may be thought to be feasible to adaptively change the operating frequency necessary for processing respective booted tasks without delay and to decrease the processor's power consumption by determining the optimum power source voltage responsive to the operating frequency changing with lapse of time. However, there lacks the prior art technique which has brought this to realization.

DISCLOSURE OF THE INVENTION

In view of the above depicted status of the art, it is an object of the present invention to provide a power consumption diminishing technique for a processor executing one or more tasks operating at distinct separate frequencies.

It is another object of the present invention to provide a power consumption diminishing technique for a processor of the type executing, in parallel, a periodic real-time task, that needs to be completed before the start of the next cycle, and a non-real-time task, in which no constraint is imposed on the time until completion of execution.

It is still another object of the present invention to provide a power consumption diminishing technique in which processor power consumption can be diminished as the real-time requirement of an application is accommodated.

It is yet another object of the present invention to provide, in a system in which the operating frequency of a processor and the power source voltage can be changed by dynamic control, a power consumption diminishing technique according to which the operating frequency necessary for processing the booted tasks without delay is adaptively changed, at the same time as an optimum power source voltage is determined depending on the operating frequency that is changed with lapse of time, thereby to diminish the processor power consumption.

The operating processing system or method or method according to the present invention includes a processor capable of executing, in parallel, a periodic real-time task, the execution of which needs to be completed before the commencement of the next period, and a non-real-time task, on which there is imposed no constraint as to the time point of completion of execution, and also includes an operating frequency calculating means or step for calculating an operating frequency sufficient to meet a request made on each periodic real-time task at each time point of operation of the processor, and a processor clock generating means or step for supplying clocks of the operating frequency derived from the results of calculations by the operating frequency calculating means.

The 'system' herein means a set of a plural number of devices (or functional modules each of which realizes a particular function) logically assembled together, without regard to whether or not the respective devices or functional modules are provided in the same sole casing.

It is noted that management of tasks executed by the processor or calculations of the processor's operating frequency necessary in carrying out the tasks may be implemented e.g., as functions of the operating system.

With the operation processing system and the operation processing control method according to the present invention, the operating frequency of a processor necessary for processing a periodic real-time task and a non-real-time task as booted without delay is adaptively changed, at the same time as an optimum value of the power source voltage for the processor is determined responsive to the operating frequency changed over with lapse of time to diminish the power consumption of the processor.

The operating processing system and the operating processing control method, according to the present invention, may also include a task selection and executing means or step for selecting one of given tasks to be executed, and for executing the so selected task, at each time point during the processor operation. More specifically, if a task is taken out from the leading end of a list of executable periodic real-time tasks or if, in case the list is void, a task is taken out from the leading end of the executable non-real-time tasks, the respective tasks can be executed as the requirements imposed on the periodic real-time tasks are met.

There may further be included a sleep transition means or step for causing the processor to transfer to a sleep state with a lowered operating rate responsive to depletion of the task to be executed at each time point during the processor operation.

The operating processing system and the operating processing control method, according to the present invention, may further include a power source voltage calculating means or step for calculating the power source voltage sufficient to drive the processor at an operating frequency as calculated by the operating frequency calculating means or step, and a processor power source supplying means or step for supplying the power source voltage derived from the results of calculations by the power source voltage calculating means or step to the processor.

In general, if the operating frequency of the processor is to be increased, the voltage of the supply power source must be raised. By adaptively changing the operating frequency necessary for processing the tasks booted on the processor without delay and by determining an optimum value of the power source voltage responsive to the incessantly changing operating frequency, the power consumption in the processor can be decreased effectively.

The operating processing system and the operating processing control method, according to the present invention, may further include a task information recording means or step for recording, prior to execution of a task, the information pertinent to the start time, period or processing load per period, as imposed on each periodic real-time task, and a task registration limiting means or step for referencing the information recorded by the task information recording means or step to limit registration of a new periodic real-time task so that neither the power source voltage nor the operating frequency exceeds the limitation of the processor and/or so that the requirement imposed on the pre-registered periodic real-time task will be met.

The operating processing system and the operating processing control method, according to the present invention, may further include a lower limit value setting means or step for setting the operating frequency of the processor to the lower limit value responsive to the operating frequency as found by the operating frequency calculating means falling to below a preset lower limit value in the absence of a non-real-time task. Alternatively, the operating processing system and the operating processing control method, according to the present invention, may further include a lower limit value setting means or step for setting a lower value of the power source voltage of the processor responsive to the processor power source voltage as found by the power source voltage calculating means becoming lower than a preset lower value in the absence of a non-real-time task.

In such case, the power consumption resulting from execution of non-real-time tasks can be diminished, as the completion of execution of the periodic real-time task before commencement of the next period is guaranteed, by executing the non-real-time tasks by exploiting redundant time produced in the processor by setting the lower limit value.

The operating processing system and the operating processing control method, according to the present invention, including a processor capable of executing one or more tasks, includes an operating frequency means or step for calculating an operating frequency sufficient to meet a request imposed on each task executed by the processor, processor clock generating means or step for supplying the operating frequency, derived from the results of calculations by the operating frequency calculating means, to the processor, power source voltage calculating means or step for calculating a sufficient power source voltage for driving the processor at the operating frequency as calculated by the operating frequency calculating means, and a processor power source supplying means or step for supplying the power source voltage derived from the calculated results of the power source voltage calculating means to the processor.

It is noted that management of tasks executed by the processor or calculations of the processor's operating frequency necessary in carrying out the tasks may be implemented e.g., as functions of the operating system.

With the operation processing system and the operation processing control method according to the present invention, the operating frequency of a processor necessary for processing a periodic real-time task and a non-real-time task as booted without delay is adaptively changed, at the same time as an optimum value of the power source voltage for the processor is determined responsive to the operating frequency changed over with lapse of time, thereby diminishing the power consumption of the processor.

The task management system or method for a processor capable of executing, in parallel, a periodic real-time task, the execution of which needs to be completed before the commencement of the next period, and a non-real-time task, on which there is imposed no constraint as to the time point of completion of execution, according to the present invention, includes a task information recording means or step of recording, prior to execution of a task, the information pertinent to the start time of the next period, period or to the processing load per period, as imposed on each periodic real-time task, an operation setting means or step setting the power source voltage of a processor and the operating frequency responsive to the processing load imposed on the processor, and a task registration limiting means or step of referencing the information recorded by the task information recording step to limit registration of a new periodic real-time task so that neither the power source voltage nor the operating frequency exceeds the limitation of the processor and/or so that the requirement imposed on the pre-registered periodic real-time task will be met.

With the task management system or method, according to the present invention, it is possible to limit registration of a new periodic real-time task so that neither the power source voltage nor the operating frequency exceeds the limitation of the processor and/or so that the requirement imposed on the pre-registered periodic real-time task will be met.

The task management system or method according to the present invention may include a lower limit value setting step of setting the power source voltage of the processor at a preset lower value responsive to the power source voltage of the processor as found by the power source voltage calculating step becoming lower than the preset lower value in the absence of a non-real-time task.

In this case, the power consumption caused by execution of the non-real-time task may be diminished, as the completion of execution of the periodic real-time task prior to commencement of the next period is guaranteed, by executing the non-real-time task by exploiting the redundant time produced by setting the lower limit value in the processor.

A storage medium according to the present invention has physically stored thereon a computer software in a computer-readable form, the computer software being so written that control of the computing processing by a processor will be managed on a computer system, the processor being capable of executing, in parallel, a periodic real-time task, the execution of which needs to be completed before the commencement of the next period, and a non-real-time task, on which there is imposed no constraint as to the time point of completion of execution. The computer software includes an operating frequency calculating step of calculating the operating frequency sufficient to meet a request imposed on each task executed by the processor, and a processor clock generating step of supplying operating frequency clocks corresponding to the calculated results by the operating frequency calculating step to the processor.

A storage medium according to the present invention has physically stored thereon a computer software in a computer-readable form, the computer software being so written that control of the operating processing by a processor capable of executing one or more tasks will be executed on a computer system. The computer software includes an operating frequency step of calculating an operating frequency sufficient to meet a request imposed on each task executed by the processor, a processor clock generating step of supplying clocks of the operating frequency, derived from the results of calculations by the operating frequency calculating step, to the processor, a power source voltage calculating step of calculating a sufficient power source voltage for driving the processor at the operating frequency as calculated by the operating frequency calculating step, and a processor power source supplying step of supplying the power source voltage derived from the calculated results of the power source voltage calculating step to the processor.

A storage medium according to the present invention has physically stored thereon a computer software in a computer-readable form, the computer software being so written that task management for a processor capable of executing, in parallel, a periodic real-time task, the execution of which needs to be completed before the commencement of the next period, and a non-real-time task, on which there is imposed no constraint as to the time point of completion of execution. The computer software includes a task information recording step of recording the information imposed on each periodic real-time task, such as start time of the next period, period or the processing load imposed per period, prior to task execution, an operation setting step of setting the power source voltage and the operating frequency of the processor responsive to the processing load imposed on the processor and a task registration controlling step of limiting the registration of a new periodic real-time task by referring to the information recorded by the task information recording step so that the power source voltage or the operation frequency will not exceed the limits of the processor and/or so that the request made on the pre-registered periodic real-time task will be met. Each recording medium according to the present invention is such a medium which physically furnishes a computer software to a general-purpose computer system capable of executing variegated program codes in a computer-readable form. The recording medium is removable and portable, such as a CD (Compact Disc), an FD (floppy disc) or an MO (Magneto-Optical Disc). It is also technically feasible to furnish a computer software, in a computer readable form, to a specified computer system over a transmission medium, such as network, which may or may not be wired.

These recording mediums define the structural or functional relation of cooperation for realizing the functions of preset computer software on a computer system. Stated differently, the cooperative relationship may be manifested on the computer system by installing a preset computer software on the computer system through a recording medium of the present invention, such that the operation and effect similar to those of the operation processing system or method and the task management system and method of the present invention may be achieved.

Other objects, features and advantages of the present invention will become more apparent from reading the embodiments of the present invention as shown in the drawings.

BEST MODE FOR CARRYING OUT THE INVENTION

Figure 1:
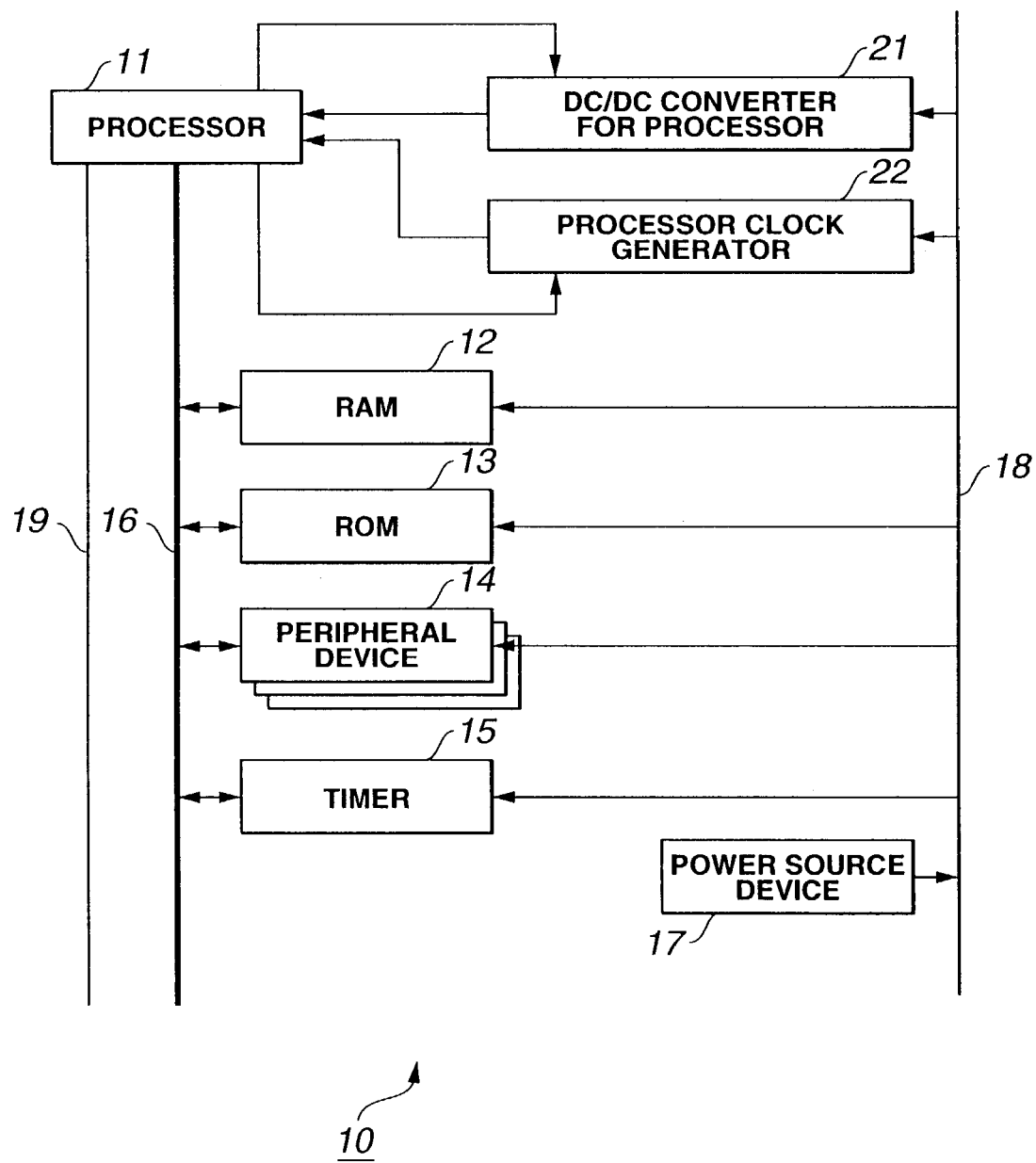
FIG. 1 is a schematic view showing a hardware structure of an operating processing system 10 embodying the present invention.

Referring to the drawings, preferred embodiments of the present invention will be explained in detail.

1. System Structure

The hardware structure of the operating processing system 10 embodying the present invention is schematically shown in FIG. 1, in which the operating processing system 10 is made up by a processor 11, a random access memory (RAM) 12, a read-only memory (ROM) 13, one or more peripheral devices 14 and a timer 15.

The processor 11 is a main controller of the operating processing system 10 and executes a variety of program codes under control by the operating system (OS).

In general, a unit of management and control of program execution by the operating system is termed a task. The processor 11 of the present embodiment has a multi-tasking mechanism of concurrent execution of plural tasks operating at respective different periods. The task may roughly be divided into a 'periodic real-time task' the execution of which must be completed before the beginning of the next period, and the 'non-real-time task' in which no constraint is imposed on the time until completion of execution.

The processor 11 is interconnected over a bus 16 to other equipment, which will be explained subsequently. The respective equipment on the bus 16 are provided with own inherent memory addresses or I/O addresses. By these addresses, the processor 11 is able to access the respective equipment. The bus 16 is a common signal transmitting path including an address bus, a data bus and a control bus.

The RAM 12 is a rewritable memory, and is used for loading the program codes executed by the processor 11 or transiently storing work data of the program being executed. The program codes may be exemplified by, for example, BIOS (Basic Input/Output System), device drivers for hardware operating the peripheral devices, operating systems and applications.

The ROM 13 is a non-volatile memory for permanently storing preset codes and data, and holds e.g., the BIOS and power-on-self-test (POST) program.

The peripheral devices 14 may be exemplified by a user's output device, such as a display or a printer, a user's input device, such as a keyboard or a mouse, an external memory device, such as a hard disc or other medium drives, and communication devices, such as a network interfacing card.

To the peripheral devices is assigned an interrupt level, such that, responsive to occurrence of a preset event, such as input at a keyboard or mouse click, a corresponding notice may be made to the processor 11 over an interrupt request signal line 19.

The timer 15 is a device for generating timer signals at a preset period. To the timer 15, there is also assigned an interrupt level, such that periodic interrupt may be caused to occur in the processor 11 over interrupt request signal line 19. It should be noted that, if there exist plural periodic real-time tasks, having distinct separate periods, the timer signals provide no periodic interrupt.

The above-described respective components of the above system 10 are fed with the power from a power source device 17 over a power source supply line 18. Although the power source device 17 is made up of, for example, a battery or a commercial AC power source, a constant power source voltage may be supplied by an AC/DC adapter or a DC/DC converter.

In the embodiment illustrated, a dedicated DC/DC converter 21 is provided for the processor 11. In the present embodiment, the processor 11 is provided with the function of setting the supply voltage from the DC/DC converter 21.

The processor 11 is fed with operating clocks generated by a processor clock generator 22 and is driven synchronously to the operating clock frequency. By and large, the performance or processing speed of the processor 11 is increased with increase in the operating frequency, with the power consumption also being increased. In the present embodiment, the processor 11 has the function of setting the operating frequency of the clocks generated by a processor clock generator 22 under control by the operating system.

Meanwhile, it is not mandatory to dynamically control both the power source voltage and the operating frequency for the processor 11 by the DC/DC converter 21 for the processor and by the processor clock generator 22, such that operation by only one of them suffices to achieve the favorable effect of the present invention. Stated differently, the favorable effect of the present invention can be achieved even in case the operating system is not such as dynamically controls both the power source voltage and the operating frequency for the processor 11, but is such as dynamically controls only one of the power source voltage and the operating frequency for the processor. Alternatively, only one of the power source voltage and the operating frequency may be set by operating processing, with the other following up with the setting automatically (for example, the frequency of the processor 11 may be set by the operating system, with the necessary minimum power source voltage for operation at the so set frequency being then automatically supplied to the processor 11).

2. Interface for Application

The operating processing on the operating processing system 10 occurs in such a manner that the processor 11 executes the application task under control by the operating system, as described above. The operating system means a basic software for comprehensively managing the hardware and the software of the system 10 and provides the application with an interface for invoking (calling) the basic function of the operating system, that is API (Application Program Interface).

As stated previously, the unit of management and control of program execution by the operating system is termed a task. The task may roughly be divided into a 'periodic real-time task' the execution of which must be completed before the beginning of the next period, and the 'non-real-time task' in which no constraint is imposed on the time until completion of execution.

Figure 2:
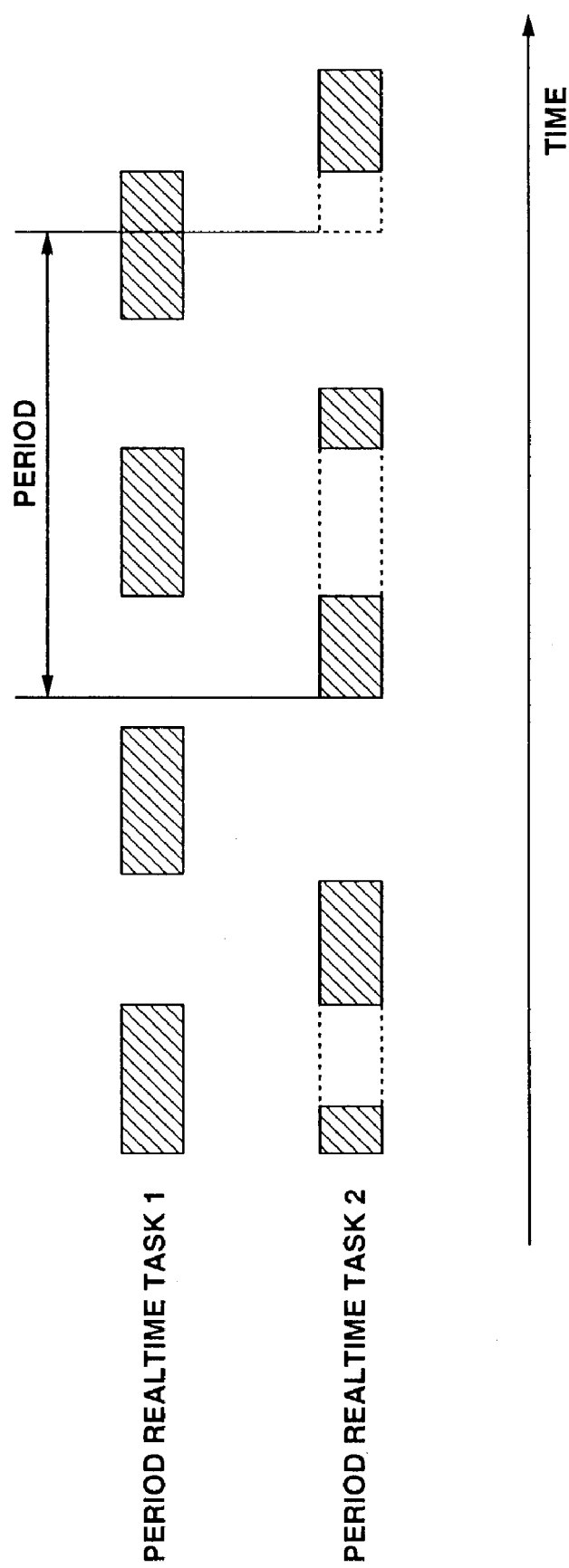
FIG. 2 schematically shows the state of concurrent execution of plural real time tasks being executed at different periods.

The periodic real-time task is a task booted periodically at a certain period. It is noted that there are variable periods of the periodic real-time tasks. FIG. 2 schematically shows the state in which plural periodic real-time tasks are being carried out simultaneously with different periods.

The periodic real-time task is executed, each time it is booted, within a range not exceeding a processor use quantity as set at the outset by the application program. The 'processor use quantity' means the time necessary for one period to be completed under a condition of the processor operating frequency fixed at a maximum value.

The operating system of the present embodiment controls the operating frequency and the sequence of task execution in such a manner that the execution of the periodic real-time task will be completed before the start of the next period.

The 'non-real-time task' is a task in which no constraint is imposed on the time until completion of execution.

The operating system of the present embodiment provides the application program with respective interfaces, namely 'registration of periodic real-time task', 'periodic execution of periodic real-time task', 'cancellation of registration of periodic real-time task', 'start of execution of non-real-time task' 'completion of execution of non-real-time task' and 'setting of a lower limit of the operating frequency'.

(1) Registration of Periodic Real-Time task

In employing this interface, the application program provides the operating system with the following information:

the ask booting period, which is the period of booting of a task;

the processing load per one period of the task; and other information necessary for execution of a task.

The processing load may be expressed in a variegated manner. For example, when the processor 11 continues to execute the task at the maximum operating frequency, the processing load may be expressed by the calculation time needed for processing one period. The other information necessary for execution of a task may be enumerated by the task execution start address or by the location of a stack area. It is noted that this information is not essential to the controlling of the operating frequency, power source voltage or the sequence of task execution.

Based on the above information, the operating system verifies whether or not execution of a new periodic real-time task is feasible as the request of the periodic real-time task already registered is met. If it is verified that the new periodic real-time task is not feasible, that effect is notified to the application program, while the task is not registered. If conversely it is verified that the new periodic real-time task is feasible, the task is registered.

(2) Periodic Execution of Periodic Real-Time Task

The periodic real-time task, which succeeded in winning the registration by the above-mentioned interface 'registration of periodic real-time task', can start periodic booting by the invocation of this interface. In employing this interface, the application program affords a value that can identify a task to the operating system.

It is also possible to omit this interface to effect the implementation so that booting will be started simultaneously with success in task registration, while it is similarly possible to effect the implementation by providing an interface adapted for making a request for starting the periodic booting as from the specified time.

(3) Cancellation of Registration of Periodic Real-Time Task

When employing this interface, the application program provides the operating system with a value that can identify a task.

(4) Start of Execution of Non-Real-Time Task

The invocation of this interface enables execution of the specified non-real-time task. When employing this interface, the application program provides the operating system with the information, such as the task execution start address, stack area position or the sequence of priority of execution between non-real-time tasks.

(5) Completion of Execution of Non-Real-Time Task

The invocation of this interface disables subsequent execution of the specified task. It is however possible to effect implementation so that execution can be restarted by the invocation of the aforementioned interface 'start of execution of non-real-time task'.

(6) Setting a Lower Limit for the Operating Frequency

This is an interface for setting the operating frequency, as set by an operating system, so as not to fall below a certain threshold value. The operating system routinely attempts to actuate the processor at a minimum operating frequency which is necessary and sufficient to execute a periodic real-time task. Consequently, the processor time to be used for executing a non-real-time task tends to be insufficient. In such case, this threshold value can be set to a larger value to make allowance for executing the non-real-time task.

3. Implementation of Operating System

The operating system of the present embodiment holds the following variables:

$e_i$: start time of the next period
$p_i$: period
$c_i$: processing load per period from one task to another. It is noted that the suffices of the respective variables are task numbers used for identifying the task.

Additionally, the operating system of the present embodiment holds the following variables:

$l_r$: The sum of quotients obtained on dividing the processing loads of the periodic real-time tasks, as currently registered in the operating system, by the period. That is, this variable corresponds to a use rate of the processor 11 and assumes a value of from 0 to 1.0. If $l_r$ is a value less than 1.0, the processor 11 is in a position of executing a periodic real-time task anew. The variable $l_r$ is updated at the time of registration of a periodic real-time task.

$l_a$: The sum of the quotients obtained on dividing the processing loads of the periodic real-time tasks, currently registered in the operating system and having booting requests issued, by the period. That is, this variable corresponds to a use rate of the processor 11 and assumes a value of from 0 to 1.0. The variable $l_a$ is updated at the time of registration of a periodic real-time task.

$f_{min}$: The lower limit value of the operating frequency as set by the application program.

$R_r$: This is a list of periodic real-time tasks that can be executed. This list is made up by the totality of periodic real-time tasks, each of which is started at a certain period but has not completed the execution of the period and which is in a state of not awaiting the occurrence of various events. The tasks in this list are arrayed in the order of increasing values of $e_i$ (the start time of the next period).

$R_b$: This is a list of executable non-real-time tasks. This list is made up of all non-real-time tasks started and not executed completely and which are not awaiting the occurrence of various events. The arraying sequence of the tasks in this list is optional, for example, a first-in first-out (FIFO) system may be used. However, if an execution priority sequence is set for the non-real-time tasks, the tasks in the list may be arrayed in a sequence which is the same as this priority sequence.

Figure 3:
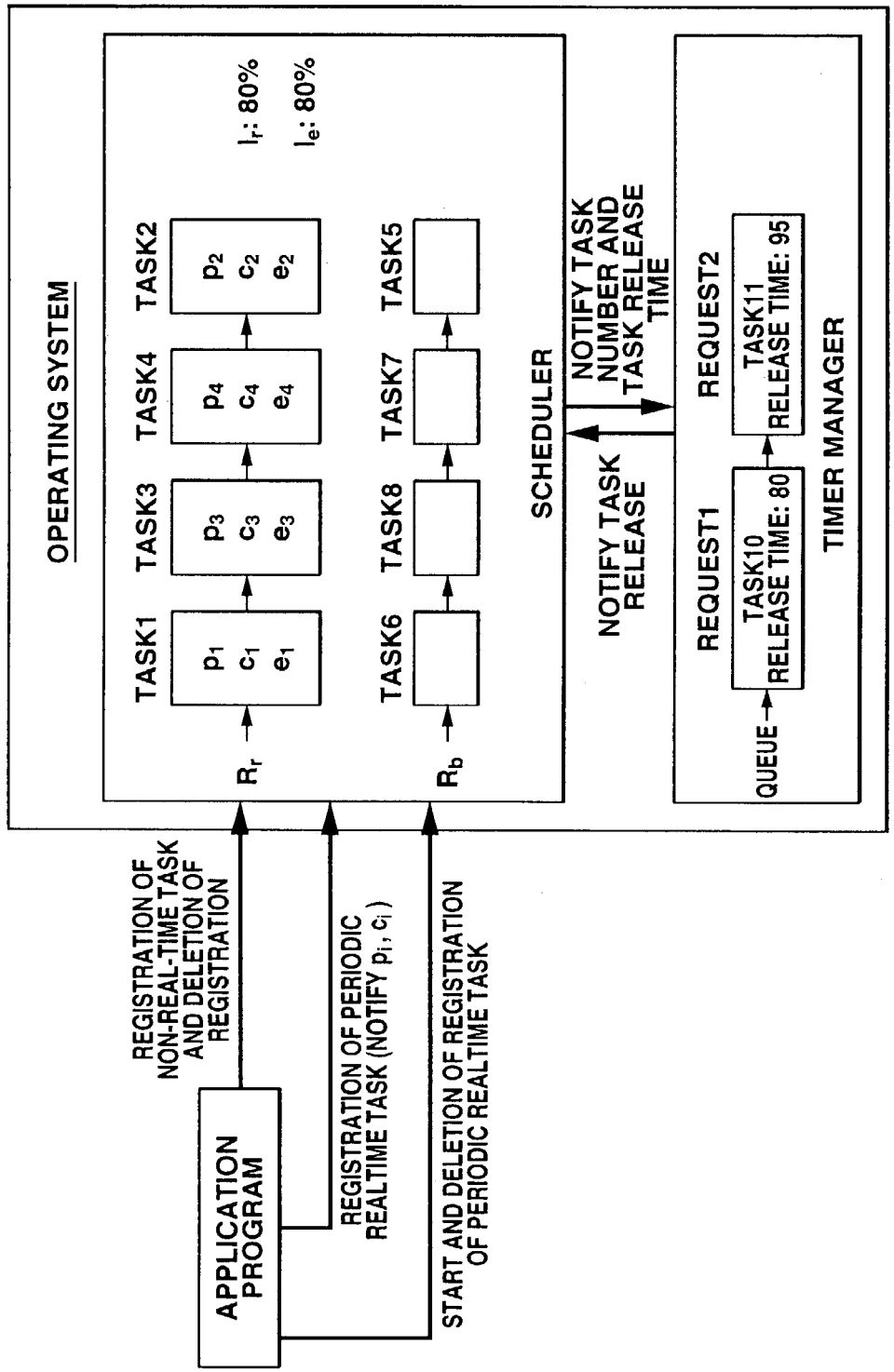
FIG. 3 is a schematic block diagram showing the functional structure of an operating system embodying the present invention.

FIG. 3 illustrates the functional structure of the operating system of the present embodiment, with particular attention directed to the task management function.

As shown, the operating system includes a scheduler and a timer manager.

The timer manager is a functional module responsible for timer management of the processor 11 in accordance with timer signals supplied from the timer 15. The time manager is a queue for holding the requested tasks in a preset sequence, for example, in a sequence in agreement with the time of start of execution. Each task in the queue includes a task identifier and an execution start time (release time).

In the illustrated instance, a request 1 for a task 10 at a release time 80, and a request 2 for a task 11 at a release time 95 are stored in the queue in the timer manager.

The scheduler is a functional module responsible for schedule management of each booted task, and includes a list $R_r$ of the executable real-time tasks and a list $R_b$ of the executable non-real-time tasks. The scheduler also manages sums of quotients $l_r$ and $l_a$ obtained on dividing the processing loads of the periodic real-time tasks by the period. It is noted that $l_r$ is the value at the time of registration of the periodic real-time task and $l_a$ is the value at the time of the request for booting the periodic real-time task.

In the instance illustrated, periodic real-time tasks are registered in the list $R_r$ in the order of tasks 1, 3, 4 and 2. In the list Rb, non-real-time tasks are registered in the order of tasks 6, 8, 7 and 5. The sums $l_r$ and $l_a$, obtained on dividing the processing loads by the period, are both 80%, indicating that a periodic real-time task can be executed anew.

The timer manager notifies task booting, that is release, to the scheduler. On the other hand, the scheduler notifies the task numbers and the task booting time to the timer manager.

The application program is configured for accepting, by the above-mentioned interfaces, a request for registration of a periodic real-time task, accompanied by notices of $p_i$ and $c_i$, a request for booting and registration cancellation of the periodic real-time task and a request for registration and registration cancellation of the non-real-time task, in connection with the scheduler in the operating system.

4. Task Control by the Operating System

The processing operation by the program, carrying each interface of the above-described operating system, is hereinafter explained.

Figure 4:
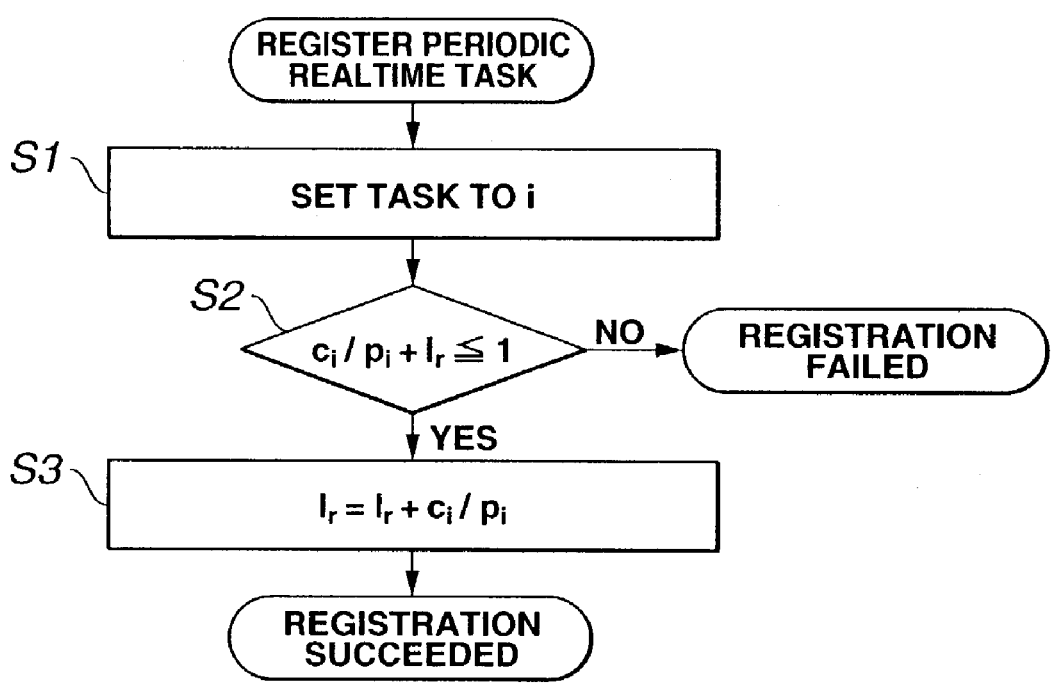
FIG. 4 is a flowchart showing the processing sequence implemented at an interface which registers the periodic real-time task.

FIG. 4 shows a flowchart showing the processing sequence implemented in each interface adapted for registering the periodic real-time task. Referring to this flowchart, the registration processing of the periodic real-time task is now explained.

First, a task number i is accorded to a newly registered periodic real-time task (step S1) to make a trial calculation of a sum value $l_r$ obtained on dividing the processing loads of the periodic real-time tasks currently registered in the operating system by the period.

Then, $l_r$ is compared to 1 as to whether or not it is larger than 1 (step S2). If $l_r$ exceeds 1, no new periodic real-time task can be executed, so that registration is verified to be a failure. If $l_r$ is less than 1, the new periodic real-time task is still in the executable state, so the value of $l_r$ is updated (step S3), and the registration is verified to be a success.

Figure 5:
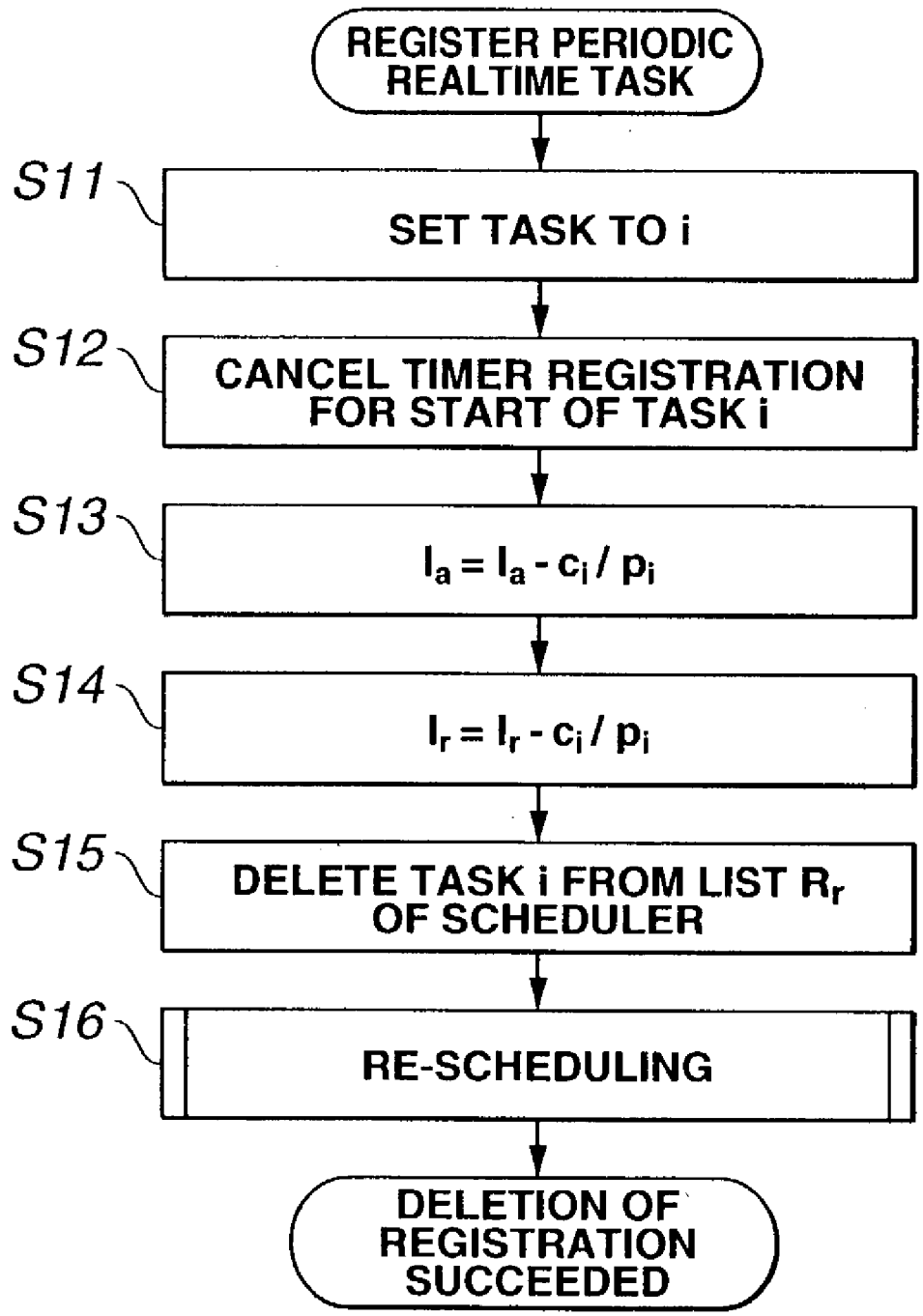
FIG. 5 is a flowchart showing the processing sequence implemented at an interface which cancels the registration of the periodic real-time task.

FIG. 5 shows, in a flowchart form, the processing sequence implemented in an interface adapted for canceling the registration of the periodic real-time task. By referring to this flowchart, the processing of canceling the registration of the periodic real-time task is explained.

First, a task number i is accorded to the periodic real-time task the registration of which is to be canceled (step S11). The timer registration for booting the task i in the timer manager is canceled (step S12).

Then, from the sum $l_r$ of the quotients obtained on dividing the processing loads of the periodic real-time tasks currently registered in the operating system by the period and the sum $l_a$ of the quotients obtained on dividing the processing loads of the periodic real-time tasks currently registered in the operating system and having the booting requests issued by the period, $c_i/p_i$ for the periodic real-time task is subtracted (steps S13 and S14).

If the periodic real-time task i, the registration of which is to be deleted, has already been registered in the list $R_r$ of the executable real-time list in the scheduler, the task i is deleted from the list $R_r$ (step S15).

The re-scheduling, separately defined, is carried out (step S16) to finish the present processing routine in its entirety. The re-scheduling processing will be explained later in detail.

Figure 6:
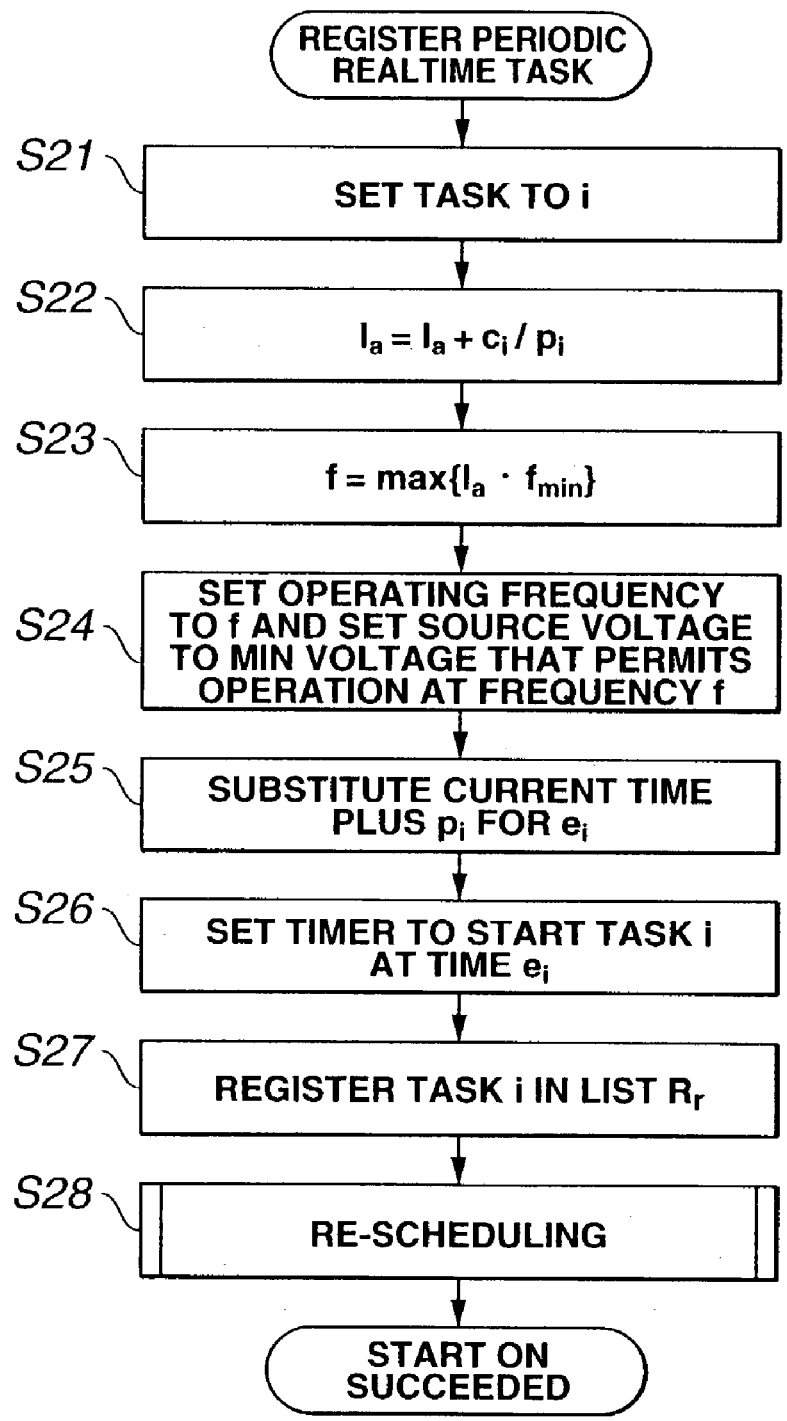
FIG. 6 is a flowchart showing the processing sequence implemented at an interface which starts the booting of the periodic real-time task.

FIG. 6 shows a flowchart illustrating the processing sequence implemented in an interface starting the booting of the periodic real-time task. The processing for starting the booting of the periodic real-time task is now explained by referring to this flowchart.

A task number i is accorded to the periodic real-time task to be started for booting (step S21). The value obtained on dividing the processing load of the periodic real-time task, currently registered in the operating system and having the booting request issued, by the period, is summed with $c_i/p_i$ for the task i (step S22).

Then, the sum $I_a$ of the quotients obtained on dividing the processing load of the periodic real-time task, currently registered in the operating system and having the booting request issued, by the period, or the lower limit $f_{min}$ of the operating frequency as set by the application program, whichever is larger, is set to a variable f (step S23).

The operating frequency of the processor 11 is set to f, while the power source voltage supplied to the processor 11 is set to a minimum voltage operable at the frequency f (step S24). The operating frequency of the processor 11 or the power source voltage may be changed by transmitting a command value to each of the processor clock generator 22 and to the DC/DC converter 21 for the processor, as described above. If the operating frequency as found from the processing load imposed on the processor 11 is lower than the lower limit $f_{min}$ of the operating frequency as set by the application program, the lower value $f_{min}$ is set as an operating frequency to enable a non-real-time task to be executed during redundant time produced in the processor 11. The result is that the power otherwise consumed as a result of the non-real-time task can be cut as completion of execution of the periodic real-time task before the commencement of the next period is guaranteed.

The current time summed to the period $p_i$ of the task i is substituted for the time of commencement of the next period $e_i$ (step S25) and the timer 15 is set so that the task i will be booted at time $e_i$ (step S26).

The task i is added and registered in the list $R_r$ of the executable real-time task in the scheduler (step S27).

By performing the distinctly defined re-scheduling processing (step S28), the present processing routine in its entirety comes to a close. The re-scheduling processing will be explained in detail subsequently.

Figure 7:
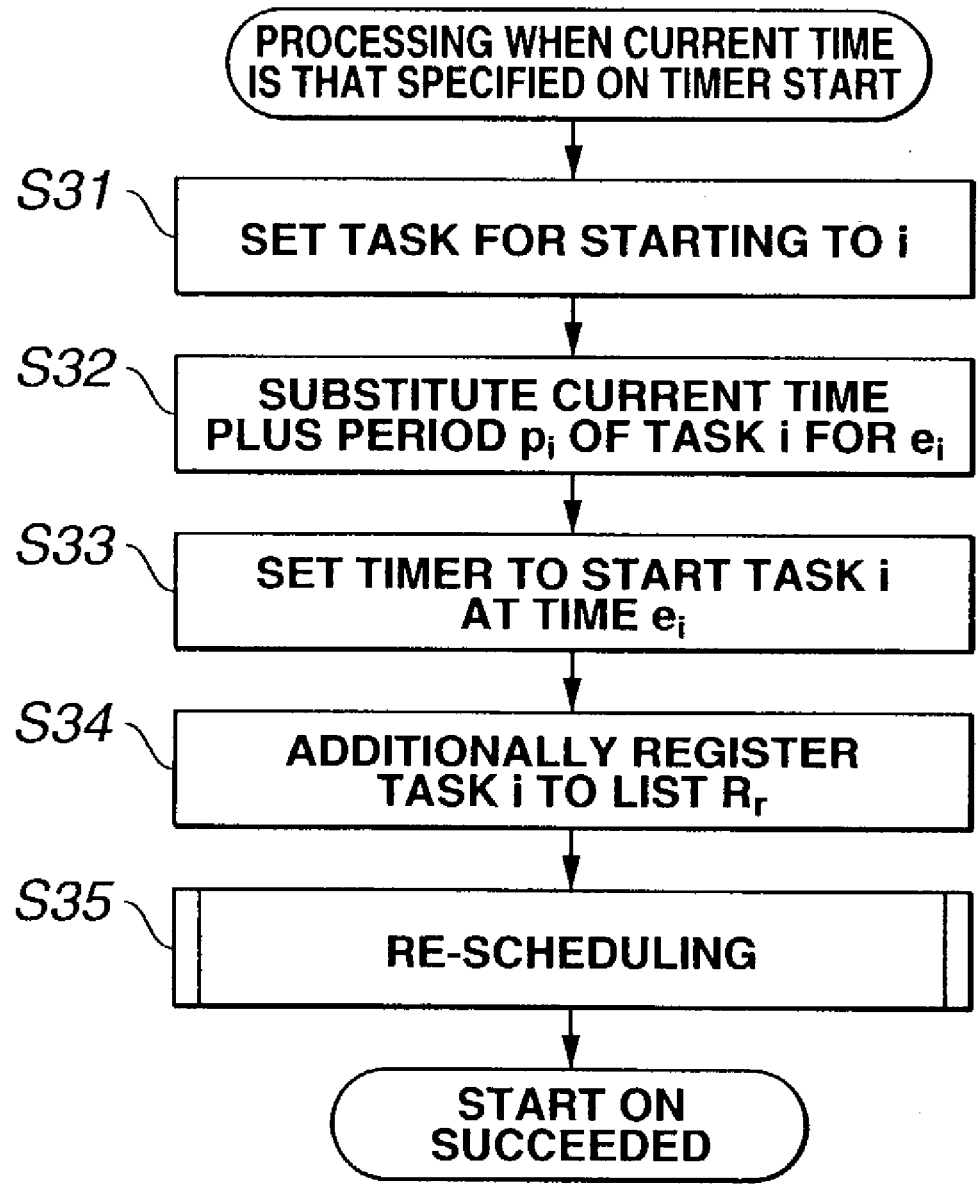
FIG. 7 is a flowchart showing the processing sequence when the time is the setting time of a timer booting a periodic real-time task.

FIG. 7 shows, by a flowchart, the processing sequence when the time is the timer setting time of booting the periodic real-time task. Referring to this flowchart, the processing when the time is the time specified by the periodic real-time task is explained.

First, the number i is accorded to the periodic real-time task to be booted (step S31).

The current time summed to the period $p_i$ of the task i is substituted for the time of commencement of the next period $e_i$ (step S32) and the timer 15 is set so that the task i will be booted at time $e_i$ (step S33).

The task i is added and registered in the list $R_r$ of the executable real-time task in the scheduler (step S34).

By performing the distinctly defined re-scheduling processing (step S35), the present processing routine in its entirety comes to a close. The re-scheduling processing will be explained in detail subsequently.

Figure 8:
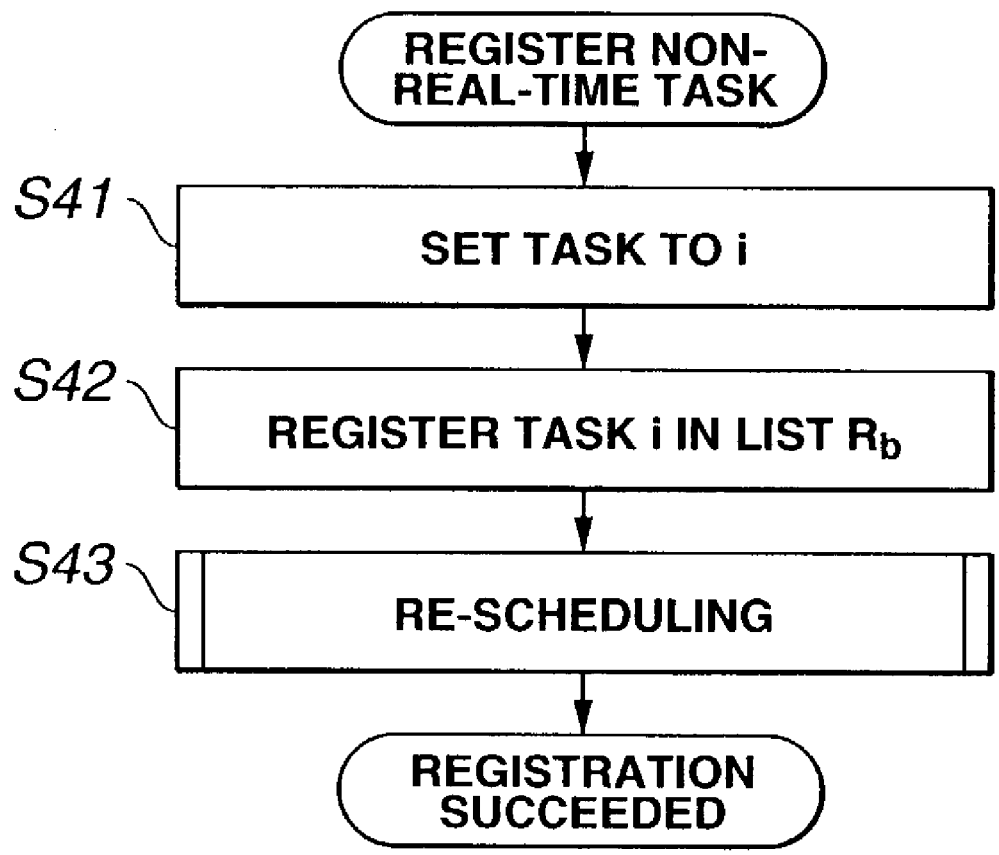
FIG. 8 is a flowchart showing the processing sequence implemented at an interface which registers the non-real-time task.

FIG. 8 shows, in a flowchart form, the processing sequence implemented in the interface which registers the non-real-time task. Referring to this flowchart, the registration processing of the non-real time task is now explained.

The task number i is first accorded to the non-real-time task to be registered newly (step S41). This task i is added and registered in the list $R_b$ of the executable non-real time task in the scheduler (step S42).

The re-scheduling distinctly defined is executed (step S43) to finish the present processing routine in its entirety. The re-scheduling processing will be explained subsequently in detail.

Figure 9:
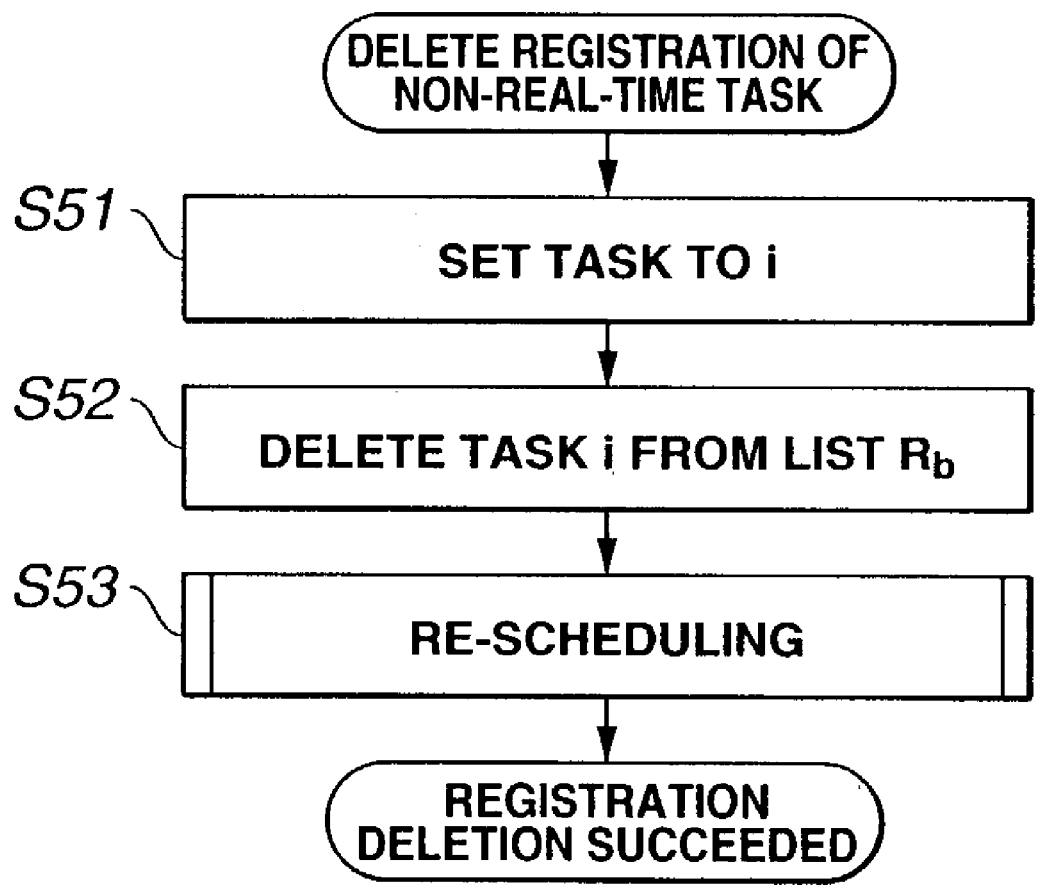
FIG. 9 is a flowchart showing the processing sequence implemented at an interface which cancels the registration of the non-real-time task.

FIG. 9 shows, in a flowchart form, the processing sequence implemented in the interface which deletes the registration of the non-real-time task. Referring to this flowchart, the processing of deleting the registration of the non-real-time task is now explained.

First, the task number i is accorded to the non-real-time task, the registration of which is to be deleted (step S51).

If this task i is already registered in the list $R_b$ of the executable non-real-time task in the scheduler, the task i is deleted from the list $R_b$ (step S52).

The re-scheduling distinctly defined is executed (step S53) to finish the present processing routine in its entirety. The re-scheduling processing will be explained subsequently in detail.

Figure 10:
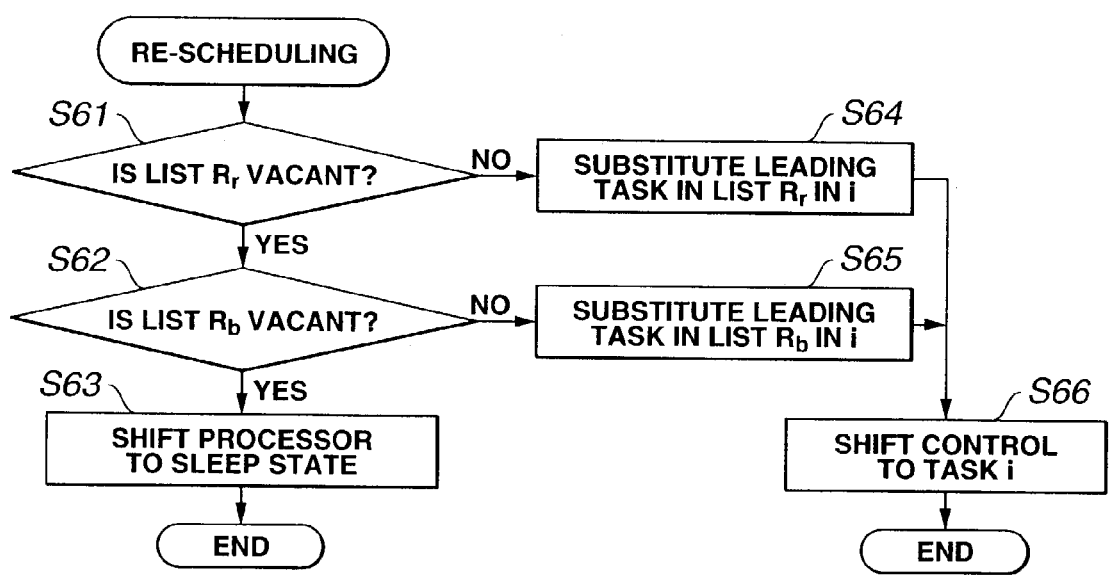
FIG. 10 is a flowchart showing the processing sequence of re-scheduling processing performed at the time of canceling and starting the booting of the registration of a periodic real-time task and at the time of registration and canceling the registration of the non-real-time task.

FIG. 10 shows, in a flowchart form, the sequence of re-scheduling processing carried out in each processing subroutine at the time of deletion of registration and startup of booting of the periodic real-time task and at the time of registration and deletion of registration of the non-real-time task. Referring to this flowchart, the processing of task re-scheduling is explained.

First, it is checked whether or not the list $R_r$ of the executable periodic real-time task is void (step S61).

If the list $R_r$ is not void, the task number i is accorded to the periodic real-time task at the leading end of the list $R_r$ (step S64). Then, control is shifted to the task i (step S66) to complete the present processing routine in its entirety.

If the list $R_r$ is void, it is checked whether or not the list $R_b$ of the executable non-real-time task in the scheduler is void (step S62).

If the list $R_b$ is not void, the task number i is accorded to the non-real-time task at the leading end of the list $R_b$ (step S65). Then, control shifts to the task i (step S66) to complete the present processing routine in its entirety.

If both of the lists $R_r$ and $R_b$ in the scheduler are void, there is currently no task to be executed by the processor 11.

So, the processor 11 shifts to a sleep state (step S63) and is caused to be in a stand-by state until occurrence of the next task.

The sleep state here means the operating mode of lowering the activity of the processor 11 to achieve power saving. However, the definition if the sleep state is not here given because it is not directly relevant to the purport of the present invention.

[Supplement]

The present invention has so far been elucidated with reference to the particular embodiments thereof. However, these embodiments can, of course, be corrected or replaced with other means by those skilled in the art without departing from the scope of the invention.

In the embodiments of the present invention, described above, the periodic real-time task is booted by a timer. However, the present invention is not necessarily limited to these specified embodiments. The periodic real-time task may be booted at an optional time insofar as the minimum booting interval is not lesser than a specified period. For example, in an operating processing system having a display device, it may be contemplated to boot a task on occurrence of an interrupt signal during the vertical blanking period. The periodic real-time task may also be booted on arrival of a packet from the network.

In sum, the present invention has been disclosed only by way of illustration and is not to be construed in a limiting fashion. The claim language needs to be referenced in verifying the purport of the present invention.

INDUSTRIAL APPLICABILITY

As discussed in detail in the foregoing, the present invention provides a superior power consumption diminishing technique that can be applied to a processor executing one or more tasks operating at different periods.

The present invention also provides a superior power consumption diminishing technique that can be applied to a processor of the type executing a periodic real-time task, which must be completely executed before the commencement of the next period, as a parallel operation with a periodic real-time task on which there is imposed no such limitation.

The present invention also provides a superior power consumption diminishing technique capable of diminishing the power consumption of the processor as the application's real-time requests are met.

The present invention also provides, for a system capable of changing the processors operating frequency and the power source voltage of the processor by dynamic control, a superior power consumption diminishing technique that can adaptively change the operating frequency necessary for processing each booted task without delay and that can set an optimum processor power source voltage responsive to the operating frequency changed over with lapse of time, to enable the power consumption of the processor to be diminished.

According to the present invention, the power consumption of the processor can be diminished as the operating frequency of the processing and the frequency of change of the power source voltage are maintained at lower values.

The periodic real-time task is a task the processing of which is completed before the commencement of the next period. Although it may be contemplated to extend a system such as to enable free setting of the time for completion of processing, that is deadline, the present invention willfully imposes limitations on the time for completion of processing to achieve a sufficiently high power consumption diminishing effect by simply varying the operating frequency at the time of task registration and deletion of task registration.

Consequently, the present invention can be applied to a hardware in which relatively long time is needed to vary the processor's power source voltage or the operating frequency.

For example, if, by reason of system configuration, it becomes necessary to set the dead line to a point previous to the time of commencement of the next period, this can be achieved by substituting the reference to a dead line for all references to a variable pi, excepting the time setting of a task booting timer.

The invention claimed is:

1. An operating processing system including a processor executing, in parallel, a periodic real-time task to be completed before commencement of a next period, and a non-real-time task without constraint as to time of completion, said operating processing system comprising:
    operating frequency calculating means for calculating an operating frequency to meet a request made on the periodic real-time task at each time point of operation of said processor;
    processor clock generating means for supplying clocks of the operating frequency having a frequency that changes in response to results of calculations by said operating frequency calculating means; and
    lower limit value setting means for setting the operating frequency of said processor to a preset frequency lower limit value responsive to the operating frequency as found by said operating frequency calculating means falling below said preset frequency lower limit value in an absence of a non-real-time task.

2. The operating processing system according to claim 1 further comprising:
    task selection and executing means for selecting one of given tasks to be executed and for executing the selected task at each time point of operation during the processor operation.

3. The operating processing system according to claim 1 further comprising:
    sleep transition means for causing said processor to transfer to a sleep state with a lowered operating rate in response to depletion of a task to be executed at each time point of operation during the processor operation.

4. The operating processing system according to claim 1 further comprising:
    power source voltage calculating means for calculating a power source voltage to drive said processor at an operating frequency as calculated by said operating frequency calculating means; and
    processor power source supplying means for supplying to said processor the power source voltage derived from calculations by said power source voltage calculating means.

5. The operating processing system according to claim 1 further comprising:
    task information recording means for recording, prior to execution of a task, information pertinent to a start time, a period or a processing load per period, as imposed on the periodic real-time task; and
    task registration limiting means for referencing the information recorded by said task information recording means to limit registration of a new periodic real-time task so that neither a power source voltage nor the operating frequency exceeds limitations of said processor and/or so that a requirement imposed on a pre-registered periodic real-time task will be met.

6. The operating processing system according to claim 4 further comprising:
lower limit value setting means for setting the power source voltage of said processor to a preset voltage lower limit value in response to said power source voltage as found by said power source voltage calculating means becoming lower than said preset voltage lower value in an absence of a non-real-time task.

7. An operating processing system including a processor executing one or more tasks, said operating processing system comprising:
operating frequency calcuating means for calculating an operating frequency to meet a request imposed on each task executed by said processor;
processor clock generating means for supplying the operating frequency derived from the operating frequency calculating means to said processor;
lower limit value setting means for setting the operating frequency of said processor to a preset frequency lower limit value responsive to the operating frequency as found by said operating frequency calculating means falling below said preset frequency lower limit value in an absence of a non-real-time task;
power source voltage calculating means for calculating a sufficient power source voltage for driving said processor at the operating frequency as calculated by said operating frequency calculating means; and
processor power source supplying means for supplying the power source voltage derived from the power source voltage calculating means to said processor.

8. An operating processing controlling method for controlling calculation processing by a processor executing, in parallel, a periodic real-time task to be completed before commencement of a next period, and a non-real-time task without a constraint as to time of completion, said method comprising:
an operating frequency calculating step of calculating an operating frequency to meet a request made on a periodic real-time task at each of a plurality of time points of operation of said processor;
a processor clock generating step of supplying clocks of the operating frequency derived from the operating frequency calculating step to said processor; and
a lower limit value setting step of setting the operating frequency of said processor to a preset frequency lower limit value in response to the operating frequency as found by said operating frequency calculating step falling below said preset frequency lower limit value in an absence of a non-real-time task.

9. The operating processing controlling method according to claim 8 further comprising:
a task selection and executing step of selecting one of given tasks to be executed and executing the selected task at each time point during operation of said processor.

10. The operating processing controlling method according to claim 8 further comprising:
a sleep transition step for causing said processor to transfer to a sleep state of a lowered operating rate in response to a depletion of a task to be executed at each time point during operation of said processor.

11. The operating processing controlling method according to claim 8 further comprising:
a power source voltage calculating step of calculating a power source voltage to drive said processor at an operating frequency as calculated by said operating frequency calculating step; and
a processor power source supplying step of supplying the power source voltage derived from the power source voltage calculating step to said processor.

12. The operating processing controlling method according to claim 8 further comprising:
a task information recording step of recording, prior to execution of a task, information pertinent to a start time of a next period, a period or to a processing load per period, as imposed on the periodic real-time task; and
a task registration limiting step of referencing the information recorded by said task information recording step to limit registration of a new periodic real-time task so that neither a power source voltage nor the operating frequency exceeds a limitation of said processor and/or so that a requirement imposed on the periodic real-time task is met.

13. The operating processing controlling method according to claim 11 further comprising:
a lower limit value setting step of setting the power source voltage of said processor at a preset voltage lower limit value in response to the power source voltage of the processor found by said power source voltage calculating step becoming lower than said preset voltage lower limit value in an absence of a non-real-time task.

14. An operating processing controlling method for controlling operating processing by a processor executing one or more tasks, said method comprising:
an operating frequency calculating step of calculating an operating frequency to meet a request imposed on each of a plurality of tasks executed by said processor;
a processor clock generating step of supplying clocks of the operating frequency derived from the operating frequency calculating step to said processor;
a lower limit value setting step of setting the operating frequency of said processor to a preset lower limit value in response to the operating frequency as found by said operating frequency calculating step falling below said Preset lower limit value in an absence of a non-real-time task;
a power source voltage calculating step of calculating a power source voltage for driving said processor at the operating frequency as calculated by said operating frequency calculating step; and
a processor power source supplying step of supplying the power source voltage derived from the power source voltage calculating step to said processor.

15. A task management system for a processor executing, in parallel, a periodic real-time task, an execution of which needs to be completed before a commencement of a next period, and a non-real-time task without a constraint as to time of completion, said system comprising:
task information recording means for recording the information imposed on each of a plurality of periodic real-time tasks, such as a start time of the next period, a period or a processing load imposed per period, prior to task execution;
operation setting means for setting a power source voltage and an operating frequency of the processor in response to a processing load imposed on said processor;
task registration controlling means for limiting a registration of a new periodic real-time task by referring to information recorded by said task information recording means so that the power source voltage or the operating frequency will not exceed limits of said processor and/or so that a request made on the periodic real-time task will be met; and lower limit value setting means for setting the operating frequency of said processor and/or the power source voltage as calculated by said operation setting means to preset lower limit values, in an absence of a non-real-time task in response to the operating frequency and/or the power source voltage as calculated by said operation setting means becoming lower than said preset lower limit values.

16. A task management method for a processor executing, in parallel, a periodic real-time task that needs to be completed before commencement of a next period, and a non-real-time task without constraint as to time of completion, said task management method comprising:

a task information recording step of recording information imposed on each of a plurality of periodic real-time tasks, such as a start time of the next period, a period or a processing load imposed per period, prior to task execution;

an operation setting step of setting a power source voltage and an operating frequency of the processor in response to a processing load imposed on said processor;

a task registration controlling step of limiting registration of a new periodic real-time task by referring to the information recorded by said task information recording step so that the power source voltage or the operation frequency will not exceed limits of said processor and/or so a request made on the periodic real-time task will be met; and a lower limit value setting step of setting the operating frequency of said processor and/or the power source voltage as calculated by said operation setting step to preset lower limit values, in an absence of a non-real-time task, in response to the operating frequency and/or the power source voltage as calculated by said operation setting step, becoming lower than said preset lower limit values.

* * * * *